(12) United States Patent
Hilpert

(10) Patent No.: US 6,666,170 B1
(45) Date of Patent: Dec. 23, 2003

(54) ANIMAL EAR TAG

(75) Inventor: Jean-Jacques Hilpert, Vitre (FR)

(73) Assignee: Allflex New Zealand Limited, Palmerston North (NZ)

( * ) Notice: Subject to any disclaimer, the term of this patent is extended or adjusted under 35 U.S.C. 154(b) by 0 days.

(21) Appl. No.: 09/581,304

(22) PCT Filed: Dec. 3, 1998

(86) PCT No.: PCT/NZ98/00178

§ 371 (c)(1),
(2), (4) Date: Jun. 8, 2000

(87) PCT Pub. No.: WO99/29167

PCT Pub. Date: Jun. 17, 1999

(30) Foreign Application Priority Data

Dec. 9, 1997 (NZ) ................................ 329361

(51) Int. Cl.⁷ .............................................. A01K 11/00
(52) U.S. Cl. .......................................... 119/814; 40/301
(58) Field of Search .................... 119/814; 40/301, 40/668; 63/12

(56) References Cited

U.S. PATENT DOCUMENTS

| | | | | |
|---|---|---|---|---|
| D229,198 S | * | 11/1973 | Cockburn | D30/43 |
| 4,102,073 A | * | 7/1978 | Hayes | 40/301 |
| 4,470,212 A | * | 9/1984 | Stafford et al. | 40/301 |
| 4,597,208 A | * | 7/1986 | Chevillot | 40/301 |
| 4,691,458 A | * | 9/1987 | Scott | 40/300 |
| 4,696,119 A | * | 9/1987 | Howe et al. | 40/301 |
| 4,721,064 A | * | 1/1988 | Denk et al. | 119/655 |
| 4,953,313 A | * | 9/1990 | Scott | 40/301 |
| D325,268 S | * | 4/1992 | Wittick et al. | D30/155 |
| 5,152,249 A | * | 10/1992 | Howe | 40/301 |
| 5,461,805 A | * | 10/1995 | Johnson | 40/301 |
| 5,588,234 A | * | 12/1996 | de Jong | 40/301 |
| 5,675,920 A | * | 10/1997 | Long | 40/301 |
| 6,021,592 A | * | 2/2000 | Caisley | 40/301 |
| 6,095,915 A | * | 8/2000 | Geissler et al. | 452/198 |
| 6,385,877 B1 | * | 5/2002 | Wikan | 40/301 |

FOREIGN PATENT DOCUMENTS

| | | | |
|---|---|---|---|
| AU | 32394/84 | 2/1985 | |
| AU | 47166/85 | 6/1986 | |
| FR | 2578713 | 9/1986 | |
| GB | 2294664 | 5/1996 | |
| WO | WO 91/00686 | * 1/1991 | |
| WO | WO 95/0445 | 2/1995 | A01K/11/00 |
| WO | WO 95/04455 | 2/1995 | A01K/11/00 |

* cited by examiner

Primary Examiner—Peter M. Poon
Assistant Examiner—Joan M. Olszewski
(74) Attorney, Agent, or Firm—Blakely, Sokoloff, Taylor & Zafman

(57) ABSTRACT

An animal ear tag including a female opening through which a head of a stem of a coupling member can pass to effect a coupling action when installing the tag on an animal, the female opening being formed as part of a separate enclosed boss component of hard material, the boss component having a flange extending peripherally from an external surface thereof, the flange being located within resilient material forming a part of the ear tag sized to anchor the boss component to the tag.

7 Claims, 2 Drawing Sheets

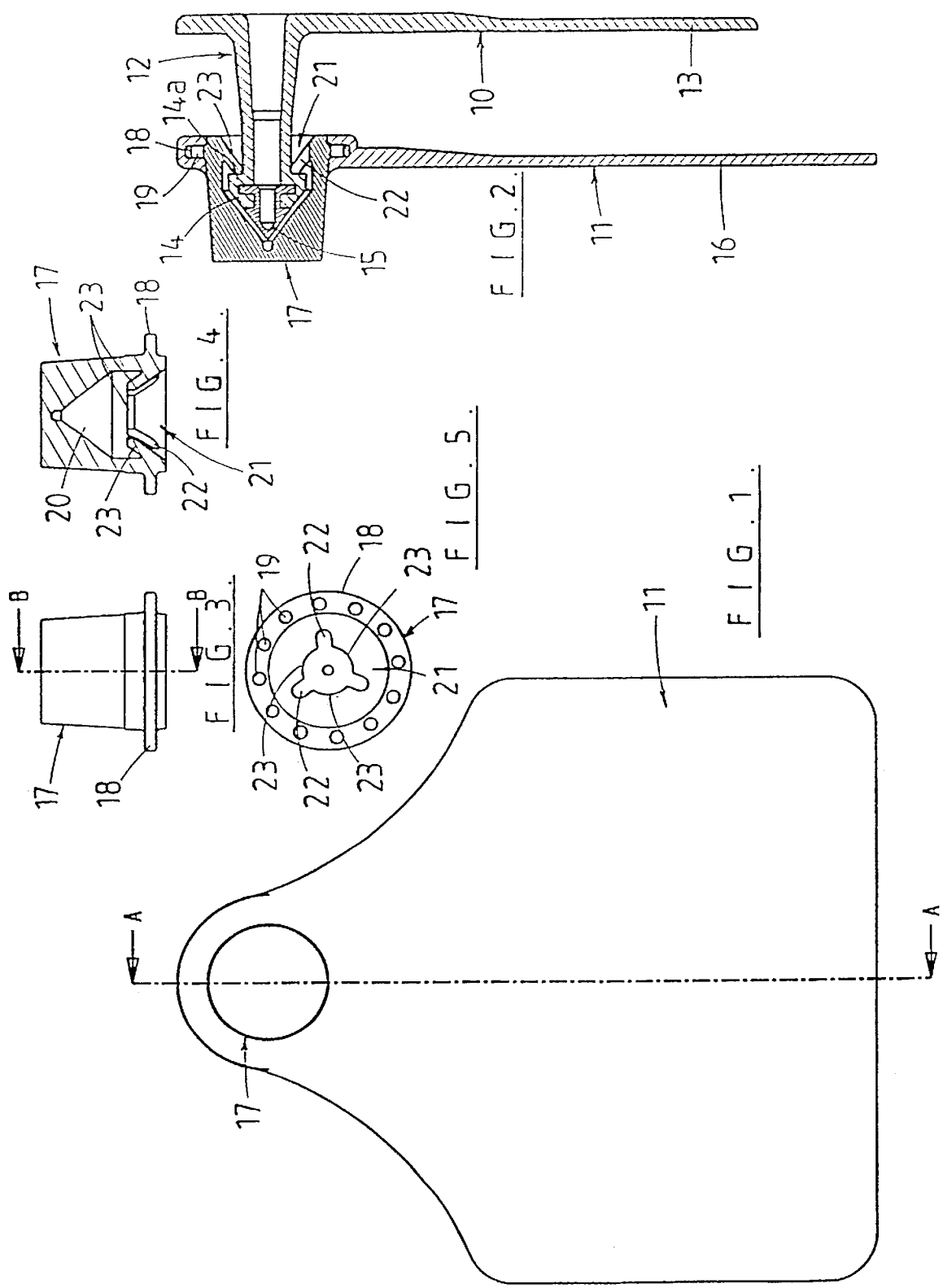

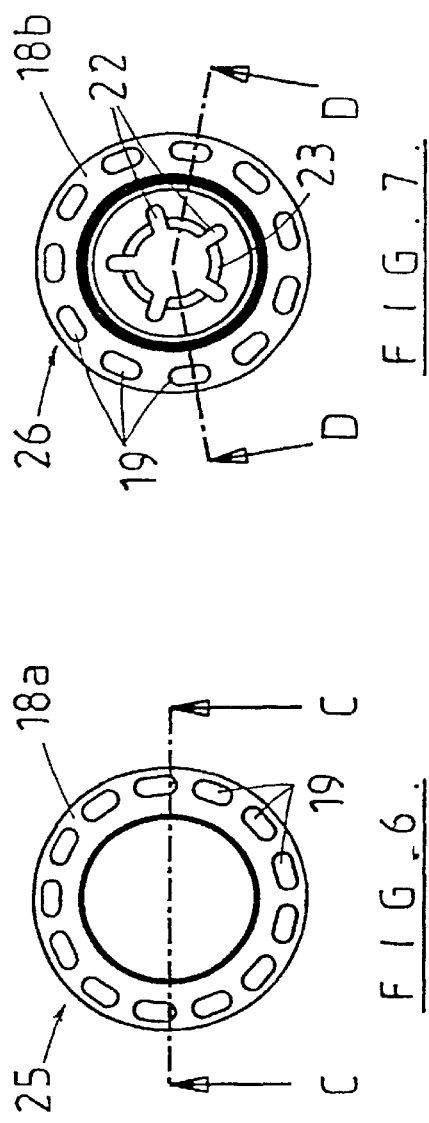
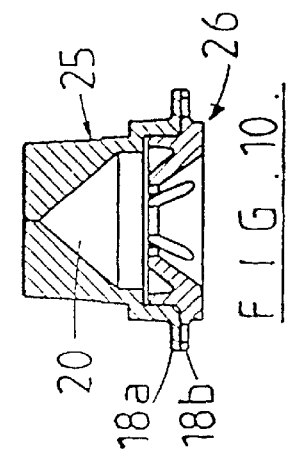
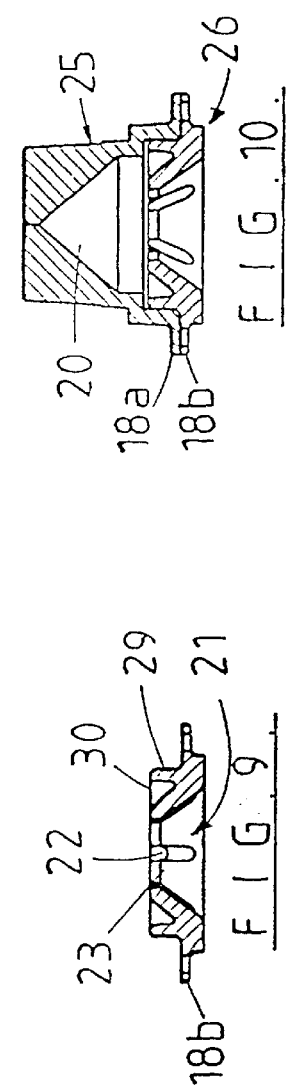

ANIMAL EAR TAG

BACKGROUND OF THE INVENTION

This invention relates to an animal ear tag.

It is well known to provide an animal ear tag having a coupling arrangement which incorporates a headed stem which is forced through an animal's ear and through an opening in a female part of the tag which is located at the side of the ear opposite to that through which the headed stem is forced. A secure coupling of the tag to the animal's ear is required to ensure that the ear tag remains in place in the animal's ear. Therefore, the coupling should be of a type which resists decoupling, especially when the tag becomes snagged in an obstruction such as a fence, gate, etc. Also, it is desirable to provide an ear tag construction which is such as to resist the tag being removed and reused for illicit retagging of animals. The ear tag, therefore, needs as far as possible to be tamperproof.

Over the years, various attempts have been made to render an ear tag tamperproof. To this end, there has been previously proposed an ear tag construction of a type described and claimed in New Zealand patent specification 213378 in which a collar is located within an enclosed boss which surrounds the opening in the female part of the tag. When the tag is installed in the ear of an animal, the headed stem is forced through the opening and locates within the collar inside the enclosed boss. Good retention characteristics are exhibited by the tag. Furthermore, access to the head is rendered difficult if an effort is made to cause the head to be forced back out through the female opening to achieve decoupling of the tag and thereby permit the tag or one or both of the components to be illicitly reused.

It was also proposed that the retention characteristics be such that applying a retraction or pulling force to the stem of the tag (when endeavouring to pull the tag apart) the head would separate from the stem and remain in the collar. This would thereby render the tag/tag components non-reusable.

SUMMARY OF THE INVENTION

The tag described in New Zealand patent specification No 213378 largely achieved its objectives. However, the object of the present invention is to provide an animal ear tag which has improved tamperproof characteristics.

Broadly, according to one aspect of the present invention, there is provided an animal tamperproof ear tag including a female opening through which a head of a stem of a coupling member can pass to effect a coupling action when installing the tag on an animal, the female opening being formed as part of a separate enclosed boss of rigid hard moulded material with a thick wall section, the having a flange extending peripherally from an external surface thereof, said flange being moulded into the resilient material forming a part of the ear tag so as to anchor said boss to the tag part, wherein the female opening is of decreasing cross-sectional area from an external part of the boss as it extends into the cavity, said female opening being at least part formed by a plurality of projections which extend inwardly from the exterior of the boss and form at the distal ends thereof a retention surface which, in use, engages with the head of the stem of said coupling member and wherein the boss component has an internal cavity in which the head can reside after passing through the female opening, the internal cavity being in close conformity with the head of the stem.

Preferably the boss is made of two separate sections, a top section which has a peripheral flange and an open end which provides a shoulder, an a base section which includes a peripheral flange and incorporates the projection in female opening, a peripheral wall of the base section engaging in said open end in a snug fit with the end of the peripheral wall butted up to said shoulder, the peripheral flanges being mated face to face.

In the preferred form of the invention the material is a resilient material and the boss includes anchoring means for anchoring the boss component with said resilient material. The anchoring means can be formed by a plurality of openings in the flanges.

The hard material can be a fibre reinforced plastics material.

BRIEF DESCRIPTION OF THE DRAWINGS

FIG. 1 is a face view of the female component of a two-piece ear tag incorporating the present invention, FIG. 2 is a cross-sectional view on line A—A of FIG. 1, FIG. 3 is an elevation view of the boss portion of the female component of the tag as illustrated in FIGS. 1 and 2, FIG. 4 is a cross-sectional view taken on line B—B of FIG. 3, FIG. 5 is a bottom plan view of the boss as shown in FIGS. 3 and 4, FIG. 6 is a plan view of a top section of a further embodiment of the boss portion.

FIG. 7 is a similar view to FIG. 6 by showing a base section of the boss portion, FIG. 8 is a cross-sectional view on line C—C of FIG. 6, FIG. 9 is a cross-sectional view on line D—D of FIG. 7, and FIG. 10 is a cross-sectional view of the top section and base section combined to form a complete boss portion.

DESCRIPTION OF THE PREFERRED EMBODIMENTS

The present invention is in a preferred embodiment as illustrated in the drawings applied to an animal ear tag formed of two separate components, namely, a male component 10 and a female component 11. The male component has a stem 12 which projects from one face thereof. The male component 10 can be simply a disc from which the stem 12 extends or it can include a panel 13 as illustrated.

The present invention can also be applied to an ear tag of one piece construction which employs a headed stem fitting with a female opening to achieve mounting of the tag to the ear of an animal.

The stem 12 at its distal end includes a head 14 which in a known manner incorporates a hard material insert 15. In known manner the pin of an applicator tool is insertable through the hollow bore of stem 12 to engage with the hard insert 15 and thereby apply a driving force to the insert 15. This forces the insert 15 through the animal's ear drawing with it the stem 12.

In accordance with known forms of ear tags, the female component 11 preferably incorporates a panel 16 on which indicia can be applied. Also, in accordance with known ear tag constructions the male and female components are preferably formed of a resilient material such as polyurethane. The use of such material results in the components 10 and 11 being flexible, thereby enabling the tag to flex upon any snagging occurring. The flexibility characteristics generally result in the tag being able to flex sufficiently so that the animal wearing the ear tag can free the tag away from a snagging obstacle rather than ripping the tag from the animal's ear.

According to the present invention, the female component 11 incorporates a separate boss component 17 which is intended to receive in a snap locking arrangement the head 14 and to retain the head within the boss. According to the invention, the boss 17 is formed by, for example, moulding and is made from a rigid hard material such as nylon. In the more preferred form of the invention the nylon includes glass reinforcing fibres with, for example, the glass fibre content being about 30%.

The boss component 17 is pre-formed and, as will be hereinafter described, incorporated using an insert moulding technique with the female component 11. Manufacture of the boss 17 can be carried out by moulding in an injection moulding process the boss about a metal core. After moulding the boss will include the metal core. However, the core will be formed from a material which is meltable at a temperature elevated beyond that which would normally be experienced during the injection moulding process. Therefore, upon moulding being completed, the boss with contained metal core would be conveyed to a melting tank in which the metal core would be melted out of the boss. By way of example, the melting tank could be at a temperature of about 185° C. The boss component would then be transferred to a rinsing tank and subsequently to a drying facility. The thus completed boss would then be ready for moulding into the female component. It is anticipated that one suitable metal for this process is bismuth or a bismuth and tin combination.

The boss 17 is moulded with at least one peripheral flange 18 located at or adjacent one end thereof. This is the end through which the head 14 is forced. This flange 18 includes anchorage means which in the preferred form of the invention comprises a plurality of openings 19.

The boss 17 is as previously mentioned pre-formed. It is then placed into a moulding tool and the female component 11 is moulded such that part of the boss 17 including the flange 18 is moulded into the plastics material from which the female component 11 is moulded. As a consequence of this plastics material will flow into openings 19 so as to increase the anchorage of the boss 17 in the tag material. Other anchorage means could be employed within the scope of the invention.

The boss 17 incorporates an internal cavity 20 which in the preferred form is shaped to be commensurate with the external shape of the head 14 of the male component but with sufficient clearance to enable the head 14 to move sufficiently into the cavity to permit a correct locking action as will hereinafter be described. The cavity 20, however, is only sufficient in volume to accommodate a single head within the boss 17.

An opening 21 into the cavity 20 is provided. This preferably is of truncated conical shape as can be seen in FIGS. 2 and 4. Slits or slots 22 are formed in the wall which defines the truncated conical shaped opening 21 thereby resulting in a plurality of inclined projections 23. In an alternative arrangement the slits or slots could be replaced by weakened sections or areas by deliberate thinning of the wall thickness at selected positions. The slots 22 do not pass through the exterior of the boss as can be seen in FIGS. 4 and 5.

Even though the boss 17 is formed of a rigid and hard material and the slots are closed at one end the slots 22 (or weakened sections), nevertheless, enable the projections 23 to flex or move as the head 14 is forced through opening 21 and into cavity 20. However, once the head 14 is located in position within the cavity 20 the projections become restored to their normal state and engage in behind the shoulder 14a of the head 14. As shown in FIG. 2, the projections 23 more preferably engage into the area defined by the joining of shoulder 14a and the adjacent external surface of the stem 12.

The projections 23 surrounding the underside or shoulder 14a of the head 14 provide a positive coupling with the head 14 so that once installed the head cannot be pulled back out of cavity 20. Therefore, the retention properties are extremely good and indeed any reverse pull on the stem 12 will only tend to increase the locking effect of the projections 23 on the stem/head. It is therefore envisaged that a pulling action or retraction force applied to stem 12 if sufficiently high will result in the stem fracturing, thereby rendering male component 10 unusable. However, stem 12 could include in its length, and possibly adjacent head 14, a waisted portion to further increase the possibility of fracture. This waisting should not be such that in normal use a force resulting from snagging will cause the stem to fracture.

If the stem 12 fractures/separates, the head 14 will remain in cavity 20. Due to the close conformity of the cavity 20 with the head 14 it will not be possible for the female component 11 to be reused as there will be insufficient space in the cavity 20 to accommodate a second head. Furthermore, the rigid nature of the boss 17 is such that the boss will not be able to bulge or deform and thereby accommodate a second head in the event that an effort is made to combine a further male component 10 with the female component.

The thick wall section and the nature of the material forming the boss 17 will also prevent any force being applied to the head 14 in an effort to force it back out through opening 21. Thereby a force applied to head 14 from externally of the boss 17 will not be able to be used to either force the head 14 out of the boss 17 to decouple the tag component or indeed where a head portion resides in the cavity (due to the stem fracturing) to force the head 14 out so that another male tag component can be used to illicitly reinstall the female component 11.

The invention is open to modification within the scope of the present disclosure. For example, even though the retention means for retaining the head within the boss is disclosed herein as being formed as part of the boss, it could be a separate element which is combined with the boss and/or body of the female component or is formed during moulding of the female component. Also, while the boss is preferably moulded in one piece the end opposite the female opening could be left open. If left open a cover piece could be fastened thereover and fixed in place as a post moulding operation.

An alternative embodiment of the boss is illustrated in FIGS. 6 to 10 where the boss is formed by two separate sections 25 and 26. The top section 25 has a peripheral flange 18a and an open end 27 which provides a shoulder 28. The lower or base section 26 includes a peripheral flange 18b and incorporates the projections 23 and opening 21. A peripheral wall 29 engages (see FIGS. 10) in open end 27 in a snug fit with the end 30 of wall 29 butted up to shoulder 28. The flanges 18a and 18b mate face to face.

Flanges 18a and 18b include openings 19 which are of an elongate form rather than the circular form of the first embodiment. The top section 25 and base section 26 when combined are located such that the openings 19 of flanges 18a and 18b are aligned or at least overlap.

The top section 25 and base section 26 can be injection moulded in a hard grade of polyurethane (TPU). Both parts are assembled, as shown in FIG. 10, before being placed within the cavity of the female mould prior to moulding. The over moulding of the tag panel material can then be performed using the traditional grades of TPU. The over moulding will retain the boss 17 as well as fix the top section 25 and base section 26 together.

With the tag of the present invention it is believed that the force required to apply the head 14 of the male component 10 through the opening 21 and into the boss will be less relative to the level of retention of the head when installed in the boss than comparable tags. The inwardly tapering opening 21 will provide good lead in characteristics for the head as it approaches the cavity and the deformity of the projections 23 will be able to occur without applying unnecessary force to the insert 15 of the head 14 which may otherwise result in the insert separating from the head and thereby leading to misapplication. It is also believed that the tag during the installation procedure will provide a clean cut through the ear of the animal.

Nevertheless, once the head is in position the engagement of the projections behind the head will ensure that the head is held in place with high retention levels. This is achieved without the need for the shoulder 14a of the head to be inclined backwardly relative to the distal or pointed end of the insert which is a technique which has been used previously to try and increase retention of the head by the female component.

The ear tag also permits the head and stem of the male component to rotate relative to the female component. This is achieved because of a clearance which exists between the head and the boss cavity and between the stem and the inclined projections.

It is believed that it may be possible that any deformation of the shoulder area 14a of the head when a retraction or pulling force is applied to the stem (such deformation being caused by the interaction with the distal or free edge of the projection 23) will enhance rather than lessen the level of retention. As the interaction between the end of the projections is directed toward the internal flange of the insert 15 it is believed that any deformation of the head will not be such as to reduce the overall cross-sectional dimension of the head and thereby enable the deformed head to escape back through the opening as defined by the distal ends of the projections 23.

The boss being formed of a rigid material will also ensure that the boss cannot be deformed either radially or longitudinally or in such other manner as to manipulate the head and/or the opening/retention projections to enable the head to be forced from within the cavity 20.

The moulding of the boss in one piece provides a benefit in that there is no need for a separate fabrication step after moulding of the female component in order, for example, to apply an end cap to the boss to enclose the boss cavity.

Therefore, the construction of the tamperproof coupling is not dependent upon the quality achieved with a separate joining or fabrication process.

It is therefore believed that an animal ear tag incorporating the present invention will exhibit extremely good tamperproof characteristics and render ear tag components which have been used unsuitable for reuse.

What is claimed is:

1. An animal tamperproof ear tag including a female opening through which a head of a stem of a coupling member can pass to effect a coupling action when installing the tag on an animal, the female opening being formed as part of a separate enclosed boss of rigid hard moulded material with a thick wail section, the boss being made by a top section and a base section each having a flange extending peripherally from an external surface thereof, said top section having an open end which provides a shoulder, a peripheral wall of the base section engages in the open end in a snug fit with the end of the peripheral wall butted up to said shoulder, the peripheral flanges being mated face to face, said flanges being moulded into the resilient material forming a part of the ear tag so as to anchor said boss to the tag part, wherein the female opening is in the base section, the female opening being of decreasing cross-sectional area from an external part of the boss as it extends into an internal cavity of the boss in which the head can reside after passing through the female opening, said female opening being at least part formed by a plurality of projections which extend inwardly from the exterior of the boss and form at the distal ends thereof a retention surface which, in use, engages with the end of the stem of said coupling member after the head has passed through the female opening, and wherein the internal cavity being in close conformity with the head of the stem.

2. An animal ear tag as claimed in claim 1 wherein the flange includes a plurality of openings.

3. An animal ear tag as claimed in claim 1 wherein, each peripheral flange has a plurality of openings, the openings in the peripheral flanges at least overlapping when the top and base section parts are combined to form the boss.

4. An animal ear tag as claimed in claim 3 wherein one of the top section part and the base section part includes the female opening.

5. An animal ear tag as claimed in claim 3 wherein the openings in at least one of the peripheral flanges are of elongate form.

6. An animal ear tag as claimed in claim 1 wherein the boss and tag part are formed from polyurethane with the boss being formed from a harder grade of polyurethane.

7. An animal ear tag as claimed in claim 1 wherein the hard material of the boss component is a plastic material incorporating fibre reinforcement.

* * * * *

UNITED STATES PATENT AND TRADEMARK OFFICE
CERTIFICATE OF CORRECTION

PATENT NO. : 6,666,170 B1
DATED : December 23, 2003
INVENTOR(S) : Hilbert et al.

It is certified that error appears in the above-identified patent and that said Letters Patent is hereby corrected as shown below:

Column 6,
Line 14, please delete "wail" and insert -- wall --.

Signed and Sealed this

Fifteenth Day of February, 2005

JON W. DUDAS
*Director of the United States Patent and Trademark Office*